United States Patent [19]
Ying

[11] Patent Number: 6,061,600
[45] Date of Patent: May 9, 2000

[54] BACKUP CONTROL MECHANISM IN A DISTRIBUTED CONTROL NETWORK

[75] Inventor: Jeffrey Ying, Glendora, Calif.

[73] Assignee: I/O Control Corporation, Azusa, Calif.

[21] Appl. No.: 08/854,160

[22] Filed: May 9, 1997

[51] Int. Cl.[7] .................................................. G05B 15/00
[52] U.S. Cl. ................................................. 700/3; 700/82
[58] Field of Search .......................... 395/200.38–200.41,
395/182.09, 185.08; 340/825.02, 825.07,
825.08, 825.21; 370/449–457, 405, 221–224;
709/208–211; 714/11, 55; 700/2–4, 9, 10,
79, 81, 82

[56] References Cited

U.S. PATENT DOCUMENTS

| | | | |
|---|---|---|---|
| Re. 31,852 | 3/1985 | Soderblom | 370/90 |
| 3,890,471 | 6/1975 | Hachenburg | 370/405 |
| 4,251,858 | 2/1981 | Cambigue et al. | 364/132 |
| 4,610,013 | 9/1986 | Long et al. | 395/182.09 |
| 4,634,110 | 1/1987 | Julich et al. | 364/131 X |
| 4,814,984 | 3/1989 | Thompson | 395/200.39 |
| 5,117,430 | 5/1992 | Berglund | 370/85.1 |
| 5,423,024 | 6/1995 | Cheung | 395/182.09 |
| 5,455,959 | 10/1995 | Simmering | 364/132 X |
| 5,461,608 | 10/1995 | Yoshiyama | 395/183.19 X |
| 5,751,220 | 5/1998 | Ghaffari | 340/825.21 |
| 5,802,043 | 9/1998 | Skillen et al. | 370/258 |
| 5,809,220 | 9/1998 | Morrison et al. | 395/182.1 |

*Primary Examiner*—William Grant
*Assistant Examiner*—Steven R. Garland
*Attorney, Agent, or Firm*—Lyon & Lyon LLP

[57] ABSTRACT

A multi-tier, master-slave control network having redundant backup for a master node in which the slave nodes are provided with means for detecting a failure of the master node and for taking over for the master node in such circumstances. The master node and slave nodes are connected to a common bus. Each of the slave nodes has an uplink transceiver and a downlink transceiver, with the downlink transceiver ordinarily isolated by switches from the common bus. Each of the slave nodes has a timer programmed with a separate failure mode detection time period. When a slave mode fails to receive control messages from the master node for a period exceeding its programmed failure mode detection time period, the slave node takes over for the master node. Because each slave node has a separate failure mode detection time period, a priority is established in which the slave nodes will take over for the master node, and redundant master backup control is provided. A preferred embodiment of the control network has multiple buses, one bus for each tier, and each bus has a master node and a plurality of slave nodes, with each of the slave nodes capable of taking over for the master node on the slave node's particular bus.

24 Claims, 13 Drawing Sheets

BACKUP CONTROL MECHANISM IN A DISTRIBUTED CONTROL NETWORK

BACKGROUND OF THE INVENTION

1) Field of the Invention

The field of the invention pertains to methods and apparatus for backup control in a distributed control network, such as may be used to perform control functions in a vehicle or automated manufacturing facility.

2) Background

Automated control systems are commonly used in a number of manufacturing, transportation, and other applications, and are particularly useful to control machinery, sensors, electronics, and other system components. For example, manufacturing or vehicular systems may be outfitted with a variety of sensors and automated electrical and/or mechanical parts that require enablement or activation when needed to perform their predefined functions. Such systems commonly require that functions or procedures be carried out in a prescribed order or with a level of responsiveness that precludes sole reliance on manual control. Also, such systems may employ sensors or other components that require continuous or periodic monitoring and therefore lend themselves to automated control.

As the tasks performed by machinery have grown in number and complexity, a need has arisen for ways to exercise control over the various components of a system rapidly, efficiently and reliably. The sheer number of system components to be monitored, enabled, disabled, activated, deactivated, adjusted or otherwise controlled can lead to difficulties in designing and implementing a suitable control system. As the number of system components to be controlled is increased, not only is the operation of the control system made more complicated, but also the wiring and inter-connections of the control system are likewise more elaborate. In addition, greater reliance on automated control has resulted in larger potential consequences if the automated control system fails.

Traditionally, control systems in certain applications, such as transit vehicles and railcars, have relied upon relay-based control technology. In such systems, relays and switches are slaved to a logic circuit that serves to switch signal connections. This approach requires a large number of relays and a substantial amount of wiring throughout the vehicle. In some instances distributed processors or logic circuits may be used for subsystems such as the door, but these processors or logic circuits often take up significant space and can be costly to maintain.

A substantial improvement has recently been made in the field of control systems. An improved network control system recently developed uses a dual-bus architecture along with distributed controllers. In this improved network control system, a primary bus forms a high-speed, bi-directional communication link interconnecting a main data bus controller with distributed slave modules, one of which acts as a second data bus controller connected to a secondary, low-speed data bus. The slave modules are generally connected to various input/output ports. The second data bus controller can be connected to second-tier slave modules over the secondary, low-speed data bus. The main data bus controller, secondary data bus controller, first-tier slave modules, second-tier slave modules, input/output ports and other system components collectively form a hierarchical system wherein the main data bus controller supervises the first-tier slave modules, including the second data bus controller, the second data bus controller supervises the second-tier slave modules, and the first-tier slave modules and second-tier slave modules supervise their assigned input/output functions.

While the dual-bus control network as described above has many advantages, there are also ways in which it could be improved further. The dual-bus control network architecture as currently known in the art generally relies on a single top-level main data bus controller. If the main data bus controller fails, system performance will be adversely impacted. Also, the possibility of a short circuit occurring, particularly over a region of the bus, is a constant danger. In addition to disrupting communication signals among the components accessing the bus, a short circuit can be difficult to trace and cause substantial disruption of system service while maintenance personnel attempt to locate the short circuit. Furthermore, while the dual-bus network control architecture reduces wiring needed in a vehicle or other automated system, simplification of wiring connections would lead to greater ease of implementation and maintenance.

Accordingly, it would be advantageous to provide a network control system that has a means for recovering from a failure in a main data bus controller or otherwise mitigating the effects such a failure. It would further be advantageous to provide a network control system that reduces the impact of a short circuit and enables rapid identification of the location of a short circuit by maintenance personnel. It would further be advantageous to provide a distributed network control system with simplified wiring and connections.

SUMMARY OF THE INVENTION

The invention provides in one aspect an automatic redundant backup master control for a master control node in a distributed, intelligent control network.

In a preferred embodiment of the invention, a master node serves as a controller for a multiplicity of slave nodes. The master node polls the slave nodes periodically. Each of the slave nodes comprises a failure mode detector whereby, if a slave node fails to receive a message from the master node within a certain fixed period of time, then the slave node takes over control for the master node.

In another aspect of the invention, prioritized redundant backup control for the master node is provided by establishing an order in which the slave nodes take over the master node, or substitute master node, in the case of multiple node failures. Preferably, each slave node is programmed to detect a failure mode condition after a different amount of time than the other slave nodes are programmed with. When the first slave node programmed with the shortest failure mode detection time detects a failure mode condition, it takes over for the master node and becomes the substitute master node. Should the substitute master node also fail, then the slave node programmed with the next shortest failure mode detection time will detect a failure mode condition and take over for the substitute master node, becoming the second substitute master node. Likewise, in turn each slave node has the capability of becoming the master node when its programmed failure mode detection time elapses. In this manner, prioritized redundant backup control is achieved for the master node.

In another aspect of the invention, a multiple-bus hierarchical control network is provided. A first-tier master node controls a plurality of first-tier slave nodes using a first common bus for communication. One of the first-tier slave nodes is connected to a second common control bus, and operates as a second-tier master node for a plurality of second-tier slave nodes connected to the second common bus. Should a failure of the first-tier master node occur, any of the first-tier slave nodes connected to the first common bus can take over the first-tier master node, doing so according to their programmed priority. Should a failure of the second-tier master node occur, any of the second-tier slave nodes connected to the second common bus can take over the second-tier master node, doing so according to their programmed priority. Redundant master control is thereby provided for both the first tier and second tier in the hierarchical control network. Similar redundant backup control may be provided for any other common buses provided in the system organized in a master-slave hierarchy.

A preferred node comprises two separate transceivers, an uplink transceiver for receiving control information, and a downlink transceiver for sending out control information. Each node therefore has the capability of performing either in a master mode or a slave mode, or in both modes simultaneously.

Further variations and embodiments are also disclosed herein, and are described hereinafter and/or depicted in the figures.

DETAILED DESCRIPTION OF THE PREFERRED EMBODIMENT(S)

This application is related to U.S. patent application Ser. No. 08/854,172 filed in the name of inventor Jeffrey Ying, entitled "Wiring Method and Apparatus for Distributed Control Network" now U.S. Pat. No. 5,907,486; U.S. patent application Ser. No. 08/853,989 filed in the name of inventor Jeffrey Ying, entitled "Multi-Tier Architecture For Control Network," and U.S. patent application Ser. No. 08/853,893 filed in the name of inventors Jeffrey Ying and Michael Kuang, entitled "Fault Isolation and Recovery In A Distributed Control Network," all three of which foregoing applications are filed concurrently herewith and hereby incorporated by reference as if set forth fully herein.

Figure 1:
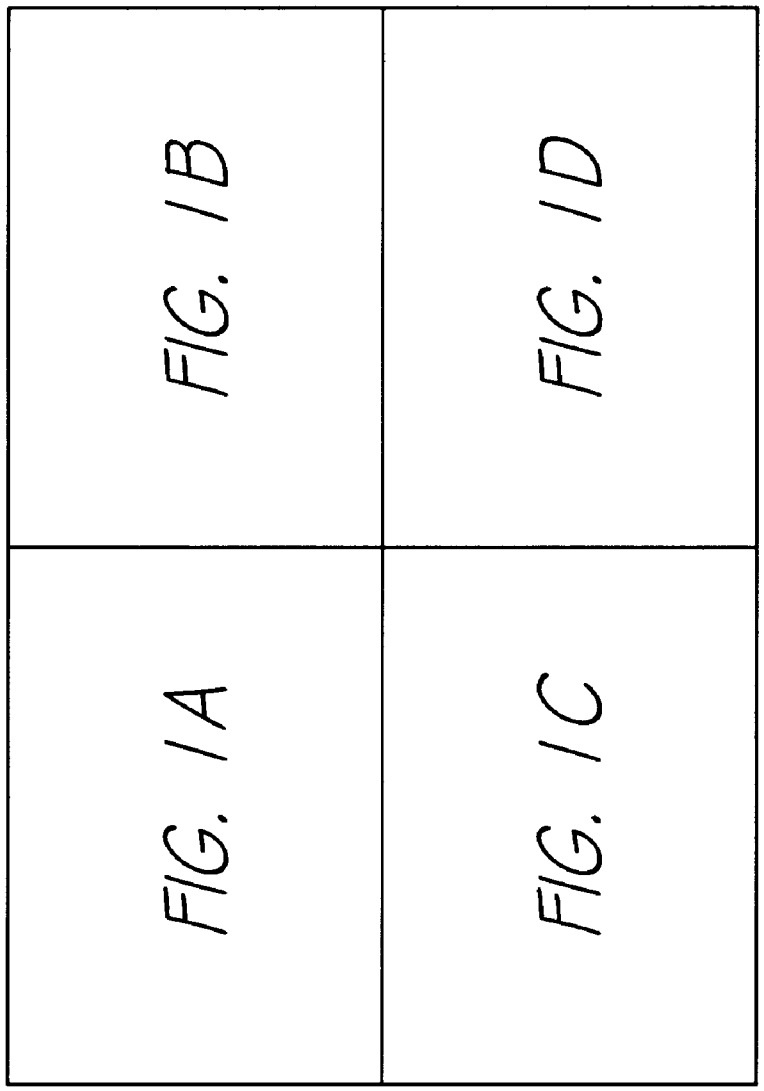
FIG. 1 is a diagram of a distributed control network with two data buses as known in the prior art.
Figure 1A:
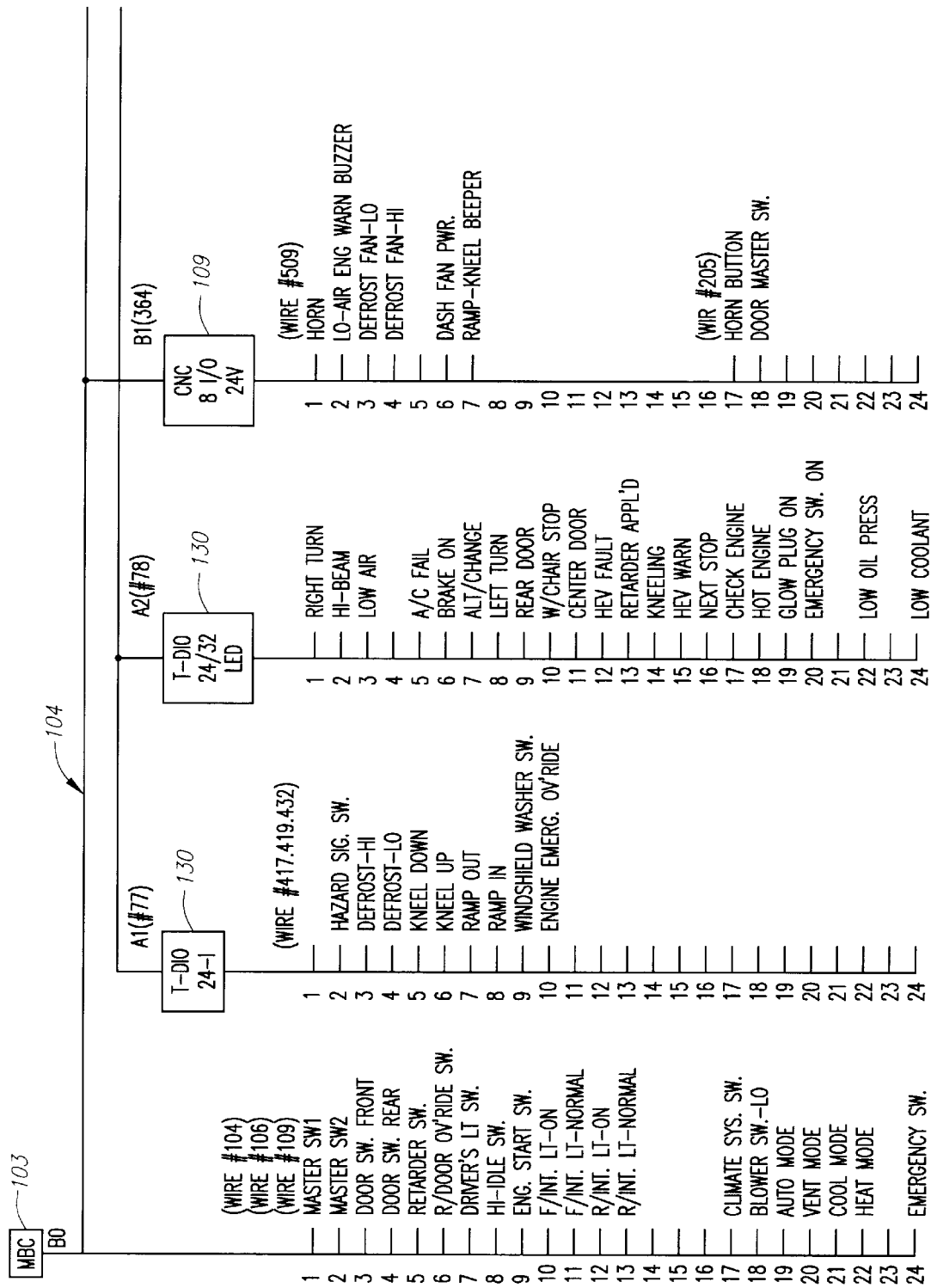
Figure 1B:
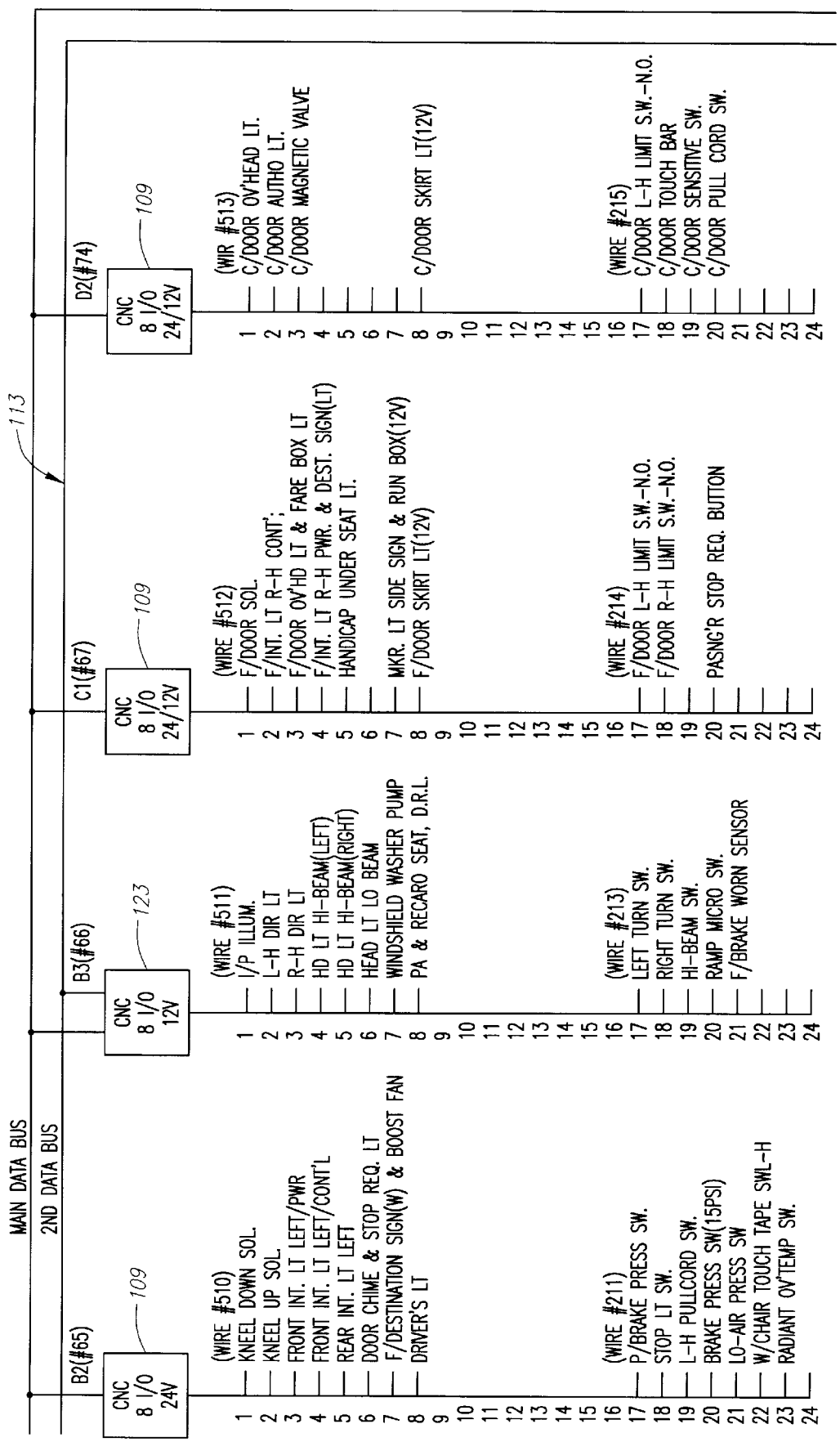
Figure 1C:
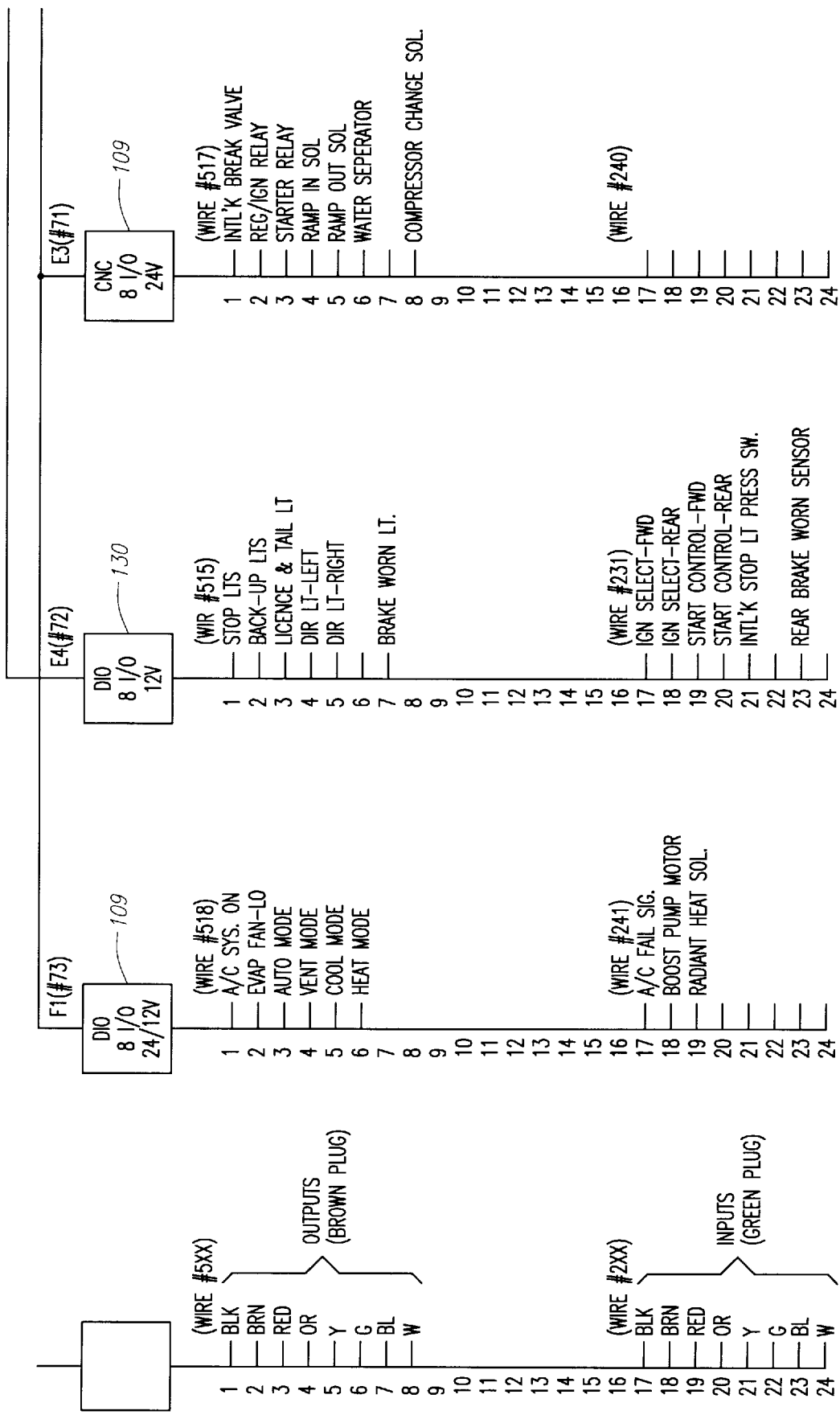
Figure 1D:
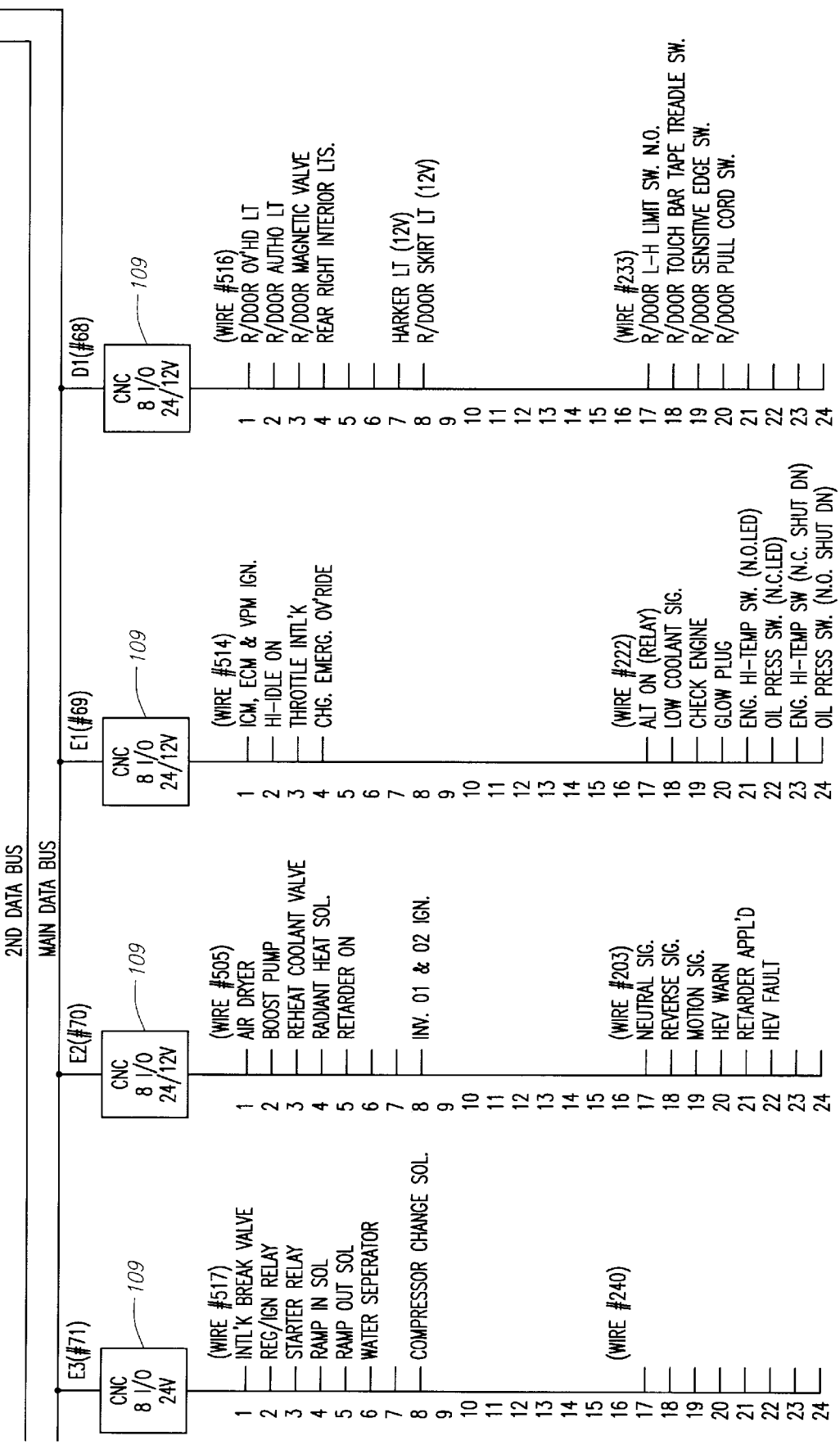

FIG. 1 is a block diagram showing the interconnection of nodes in a particular type of control network 101 as known in the art. The control network 101 comprises a main data bus controller 103 which is connected over a main data bus 104 to a plurality of first-tier slave nodes 109 and 123. One first-tier slave node 123 connected to the main data bus 104 also functions as a second data bus controller, and is connected to a second data bus 113. The second data bus controller 123 is connected over the second data bus 113 to a plurality of second-tier slave nodes 130. The main data bus 104 forms a high-speed, bi-directional communication link between the main data bus controller 103 and the first-tier slave nodes 109 and 123, and the second data bus 113 forms a low-speed, bi-directional communication link between the second data bus controller 123 and the second-tier slave nodes 130.

The nature of the slave nodes 109, 123 and 130 depends in part on the control application for which they are deployed. In a transit vehicle or railcar, for example, the master data bus controller 103 and the slave nodes 109, 123 and 130 may each be assigned to control a particular section of the vehicle or railcar, or may be assigned to control particular input and output functions. For each slave node 109, 123 and 130 in FIG. 1, various control signals are shown connected to the nodes such as to illustrate one exemplary arrangement of control functionality.

In operation, the main controller 103 communicates with the first-tier slave nodes 109 and 123 using the main data bus 104 as a high speed bi-direction link. An exemplary baud rate for communications over the main data bus 104 is 256 k. The main data bus controller 103 is generally responsible for delegating control commands to the first-tier slave nodes 109 and 123, and for responding to status information and events communicated to the main data bus controller 103 over the main data bus 104. Each of the first-tier slave nodes 109 and 123 receives commands from the main data bus controller 103, and issues appropriate commands over their respective control lines. In a similar manner, the second data bus controller 123 communicates with the second-tier slave nodes 130 using the second data bus 113 as a low speed bi-direction link (having a baud rate of, e.g., 9.6 k), and instructs the second-tier slave nodes 130 to carry out certain control functions, or responds to status messages or events relayed to the second data bus controller 123 from the second-tier slave nodes 130.

Figure 2:
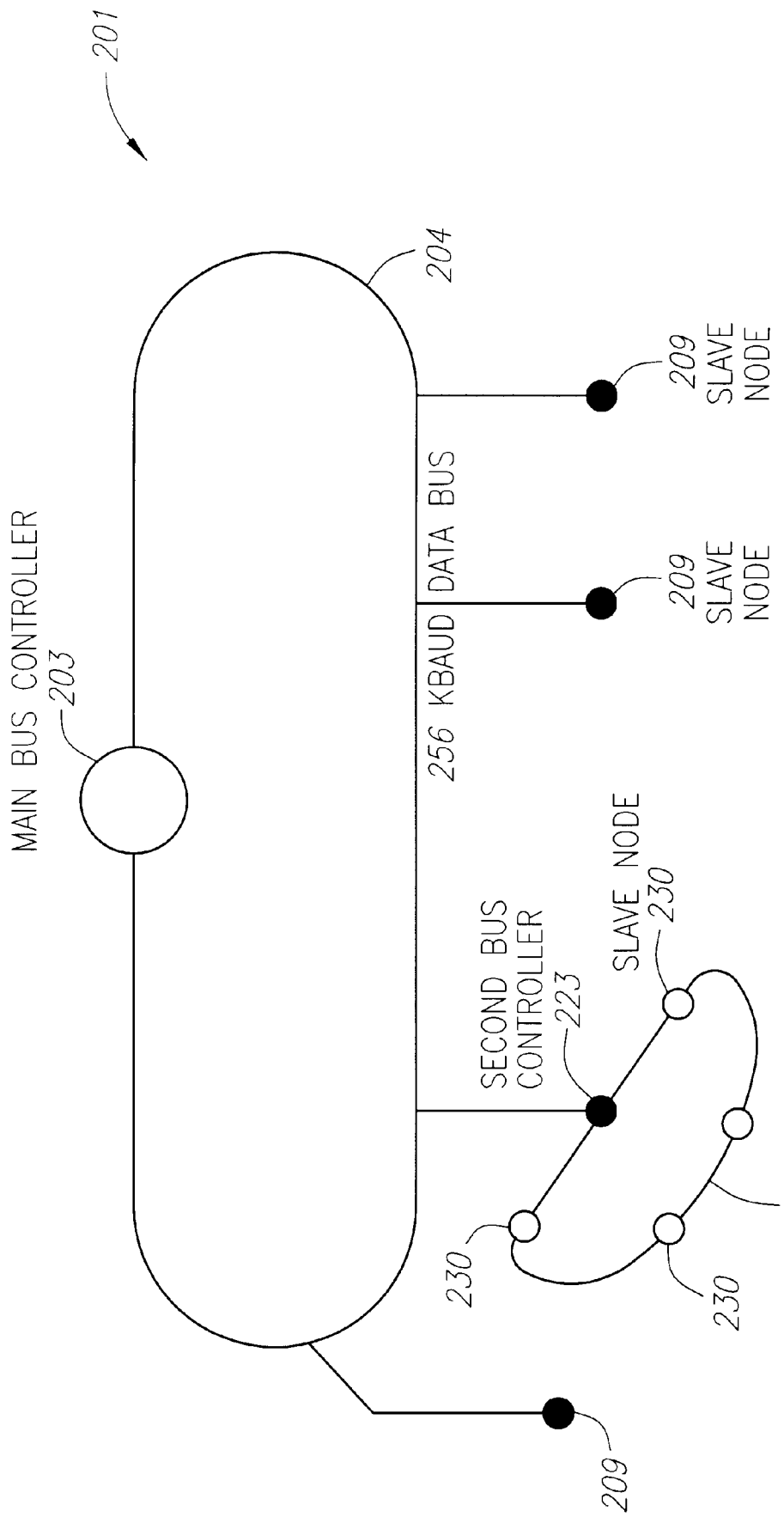
FIG. 2 is another diagram of a distributed control network having a two data buses each configured in a loop configuration as known in the prior art.

FIG. 2 is a diagram showing the layout or architecture of the FIG. 1 control network. The control network 201 shown in FIG. 2 comprises a main data bus controller 203 which is connected to a main data bus 204. The main data bus 204 is physically connected to a plurality of first-tier slave nodes 209 and 223. As explained with respect to the control network 101 shown in the FIG. 1, one of the first-tier slave nodes 223 also functions as a second data bus controller 223, and is connected over a second data bus 213 to a plurality of second-tier slave nodes 230. The main data bus 204 is configured in a loop such that it passes through each of the first-tier slave nodes 209 and 230 and returns to rejoin the main data bus controller 203. In this way, should the wires of the main bus 204 become severed, the main data bus controller 203 will still be connected to the first-tier slave nodes 209 and 223 and will not necessarily lose control over the system. Similarly, the second data bus 213 is configured in a loop such that it passes through each of the second-tier slave nodes 230 and returns to rejoin the second data bus controller 223, thereby providing an architecture resilient to potential severing of the wires of the second data bus 113. Each of the main data bus controller 203, first-tier slave nodes 209 and 223, and second-tier slave nodes 230 may be connected to a plurality of control signals for performing control or sensor functions, or various other input and output functions as necessary for the particular control application.

The control network 201 shown in FIG. 2 thus utilizes a dual-bus architecture to perform control functions. Because of the hierarchical architecture of the control system 201, relatively low baud rates on the second data bus 213 can be tolerated, leading to reduced system size, cost and complexity over traditional non-hierarchical, relay-based systems. The slower speed on the secondary data bus 213 also reduces the system's susceptibility to electromagnetic interference, a potential problem in certain control system environments (such as railcars).

Figure 3:
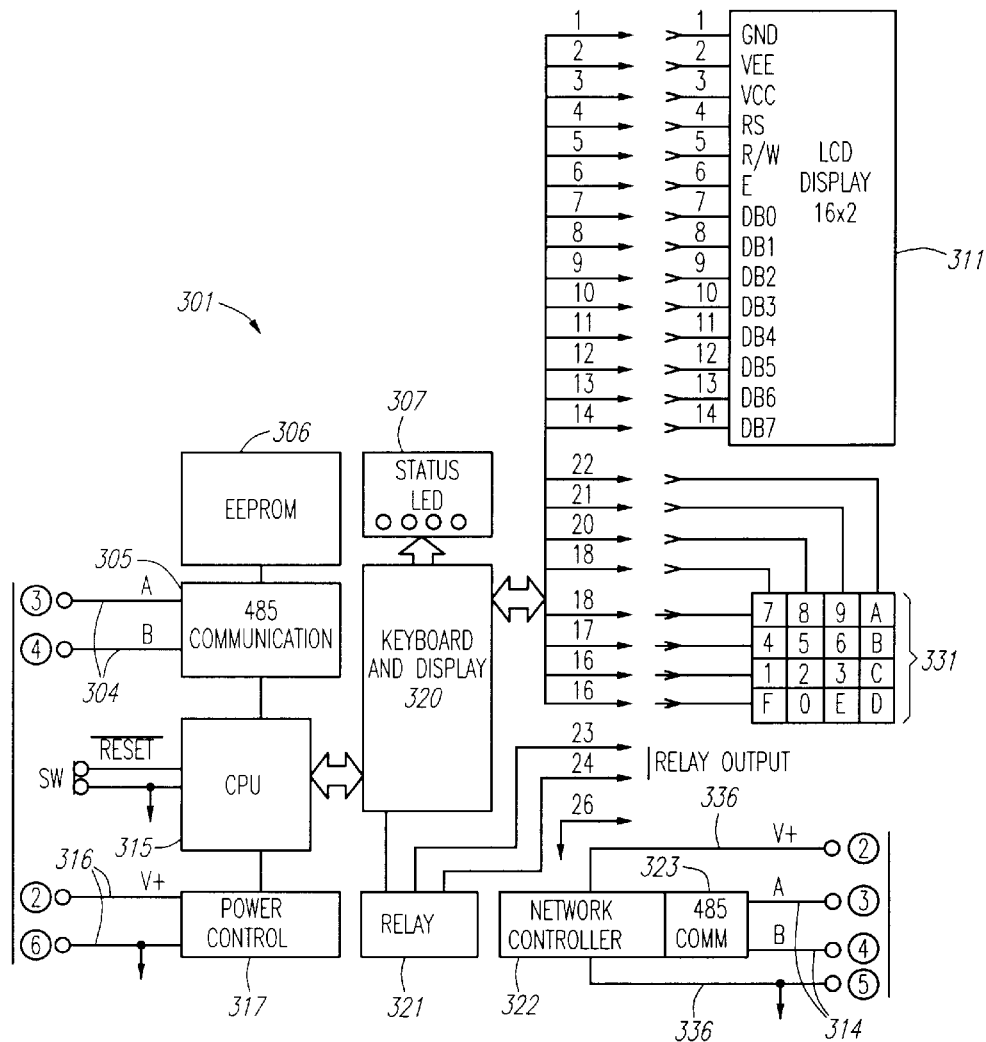
FIG. 3 is a circuit block diagram of a node that may be employed in the distributed control network of FIG. 1 or FIG. 2.

Each node, whether master data bus controller 203, first-tier slave node 209 or 223, or second-tier slave node 230, includes means for performing computations necessary for its functionality, and is configured with components such as a central processing unit (CPU) and memory. FIG. 3 is a more detailed block diagram of a node 301 (such as the master data bus controller 203, a first-tier slave node 209 or 223, or a second-tier slave node 230) that may be employed in the control network of FIG. 2. The node 301 comprises a CPU 315 connected to a power control block 317 and a transceiver 305. The node 301 is also connected to power signal lines 316, which connect to the power control block 317. The node 301 may communicate over communication signal lines 304, which are connected to the transceiver 305. An electrical erasable programmable read-only memory (EEPROM) 306 stores programming information utilized by the CPU 315 for carrying out certain programmable functions. The CPU 315 has access to a random access memory (RAM) (not shown) and read-only memory (ROM) (not shown) as needed for the particular application.

The CPU 315 is connected to a keyboard and display interface block 320. The keyboard and display interface block 320 is connected to status LEDs 307, relays 321, and LED display 311 and a keypad 331. The node 301 is thereby can accept manual inputs (e.g., from the keypad 331) or receive sensor inputs (e,g., over relays 321), and can display operational status using status LEDs 301 or LCD display 311.

The node 301 further comprises a network controller 322 which preferably comprises a second CPU. The network controller 322 is connected to a second transceiver 323 which is connected to a second pair of communication signal lines 314. The network controller also outputs power signal lines 336.

In operation, node 301 may communicate over two different data buses using transceivers 305 and 323. Thus, node 301 may communicate over a first data bus (such as data bus 204 shown in FIG. 1) by receiving and transmitting signals over communication signal lines 314 using transceiver 323, under control of the network controller 322. The node 301 may communicate over a second data bus (such as data bus 213 shown in FIG. 2) by transmitting and receiving signals over communication signal lines 304 using transceiver 305, under control of CPU 315. The CPU 315 and network controller 322 may transfer information back and forth using a shared memory (not shown). The node 301 may serve as both a "slave" unit with respect to the first data bus 204 and a "master" unit with respect to the second data bus 213. By interconnecting a plurality of nodes 301 in an appropriate configuration, a hierarchical control network with two data buses (as shown in FIG. 2) may be established.

Figure 4:
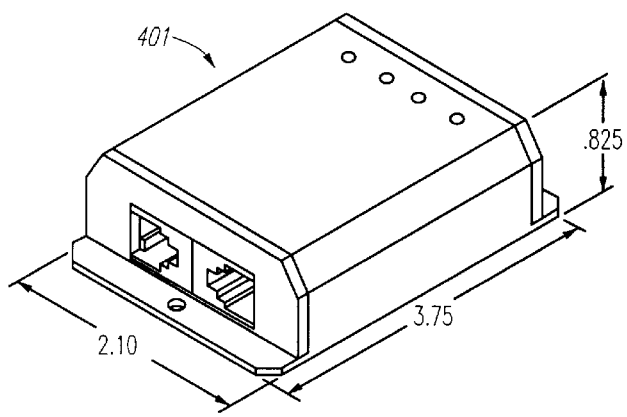
FIG. 4 is a diagram showing a physical encasement of the node shown in FIG. 3.

Each node 301 such as shown in FIG. 3 is housed in a rugged, potted case made of a suitable lightweight material such as aluminum that provides environmental protection and allows for heat dissipation. FIG. 4 is a diagram showing an exemplary physical casing 401 of a module or node 301 such as shown in FIG. 3. The casing 401 can be quite small; in the example of FIG. 4, the casing 401 measures approximately 2.1" by 3.75", and is 0.825" in thickness.

A problem that can occur in operation of a control network such as shown in FIG. 2 is that if the master data bus controller 203 fails then operation of the entire system could be jeopardized. A possible solution would be to provide a redundant master data bus controller that has the same functionality as the primary master data bus controller 203 in all respects. Upon detecting a failure of the primary master data bus controller 203, the backup master data bus controller could shut down the primary master data bus controller 203 and take over control of the network.

While having such a separate, redundant master data bus controller for backup purposes may provide a solution where the primary master data bus controller 203 fails, it falls short of being a complete solution. As an entirely separate controller having complete functional and hardware redundancy of the primary master data bus controller 203, incorporation of the backup master data bus controller effectively doubles the cost of implementing the master data bus controller 203. Also, another drawback is that if both the master data bus controller 203 the backup master data bus controller fail, then operation of the entire system would be jeopardized and operation could come to complete halt.

In addition to the possibility of the master data bus controller 203 failing, the second data bus controller 223 could also be subject to failure. While a redundant second data bus controller for backup purposes could be provided, the cost of implementing the second data bus controller would be essentially doubled, and the system is still subject to potentially complete failure should the second data bus controller also fail. Moreover, adding redundant data bus controllers could complicate the wiring of the system.

A preferred embodiment of the invention overcomes one or more of the above problems by providing redundant backup control for the master data bus controller 203 or other type of master node, the second data bus controller 223 or similar types of nodes, and, if further nested control levels exist (as described, for example, in later embodiments herein), other sub-controllers for those control levels.

Figure 5:
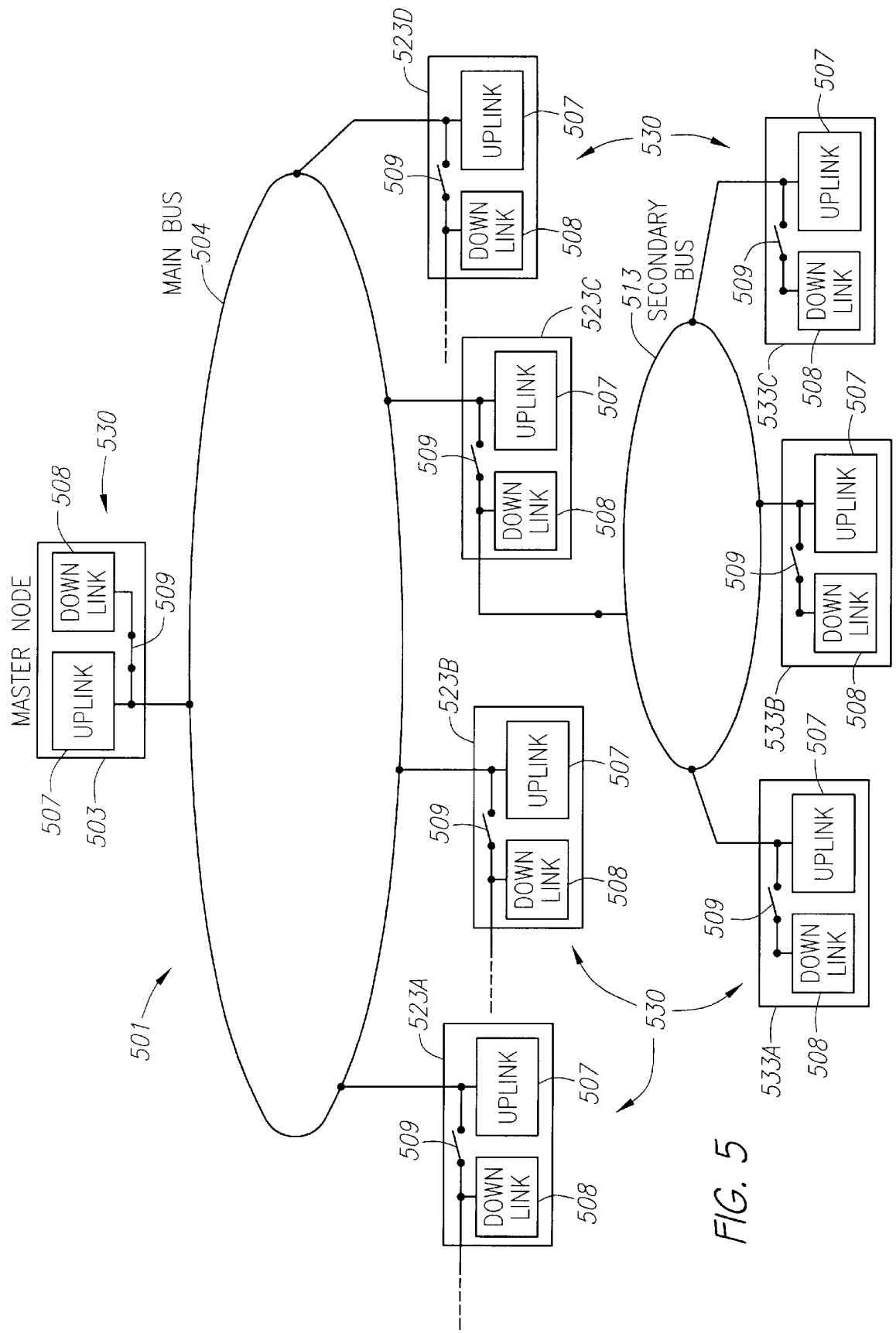
FIG. 5 is a block diagram of a preferred control network architecture in accordance with one or more aspects of the present invention.

FIG. 5 is a block diagram of a preferred embodiment of a control network 501 having redundant backup control capability for a master node at each bus level of the control network 501. Hereinafter, the node acting as the master bus controller for a particular bus will be referred to as the "master node" for that particular bus, and all the other nodes on that bus will be referred to as "slave nodes" for that particular bus. In the control network shown in FIG. 5, a master node 503 and a plurality of first-tier slave nodes 523 are connected to a main data bus 504. In a preferred embodiment of the invention, each of the slave nodes 523 is configured or can be configured to control a secondary data bus. For example, the first-tier slave node 523c is shown connected to a secondary data bus 523 in the control network 501. The first-tier slave node 523c functions as a second-tier master node with respect to second-tier slave nodes 533 connected to the secondary data bus 513. Others of the first-tier slave nodes 523 can also serve as second-tier master nodes and be connected to different secondary buses having additional second-tier slave nodes. A multi-level or multi-tiered hierarchical control network is thereby established.

Each of the master node 503, first-tier slave nodes 523, second-tier slave nodes 533, and other lower-level slave nodes (not shown in FIG. 5) are referred to hereinafter generically as "nodes" and are designated as nodes 530 in FIG. 5. In one aspect of a preferred embodiment as shown in FIG. 5, each of the nodes 530 has substantially the same hardware configuration and can therefore function as either a master node or a slave node, depending upon how the control network 501 is configured. Each data bus, along with the nodes attached to it, are generally referred to as a cell, and the master node connected to the data bus is referred to as a "cell controller" for that particular cell. As explained in more detail hereinafter, each node 530 configured as a master node transmits and receives messages over the data bus for the cell it controls. Each node 530 configured as a slave node remains in a listen mode, receiving but not transmitting messages over that data bus, unless specifically requested to transmit information over the data bus by the master node. Any number of the slave nodes can, even though operating as a slave node with respect to an upper tier, be simultaneously operating as a master node with respect to other lower-tier slave nodes at a different cell sub-level.

A preferred embodiment of the invention, as noted, comprises a mechanism for redundant backup control of any node functioning as a master node at any level or sub-level of the control network 501. As generally described, in operation of a preferred embodiment of the invention the slave nodes connected to a particular data bus monitor the data bus while in a listen mode and await periodic signals from the master node for that data bus. Upon a failure to receive a signal from a master node within an expected time, the slave nodes connected to that data bus begin a wait period (which is preferably a different wait period for each slave node connected to the data bus). When the wait period elapses, the slave node determines that a failure in the master node for the particular data bus has occurred, and takes steps to take over the functionality of the master node. Each of the slave nodes is programmed with a different wait period, so that there is no contention for replacing the master node when a master node failure has occurred. In one aspect, backup control of each master node is prioritized, such that there is a specific order in which the slave nodes can potentially take over control of the master node functionality when a failure has occurred.

In more detail, again with reference to FIG. 5, one of the nodes 530 attached to the main data bus 504 is configured as a master node 503. The other nodes 530 attached to the main data bus 504 (in this example numbering four such nodes 530) are configured as first-tier slave nodes 523, meaning that they receive but do not transmit master-control signals over the main data bus 504. The first-tier slave nodes 523 may, however, from time to time send responsive signals or status signals over the main data bus 504.

In a preferred embodiment, each of the first-tier slave nodes 523 may be configured as a second-tier master node controlling a secondary bus. One such example is shown in FIG. 5, wherein first-tier slave node 523c is connected to a secondary data bus 513. A plurality of other nodes 530 are also attached to the secondary bus data 513, and serve as second-tier slave nodes 533. There are three such second-tier slave nodes 533 in the example shown in FIG. 5. With respect to the secondary data bus 513, the first-tier slave/ second-tier master node 523c transmits master-control signals to the second-tier slave nodes 533. The second-tier slave nodes 533 ordinarily operate only in a listen mode, but from time to time may send responsive messages or status messages to the second-tier master node 523c. The other first-tier slave nodes 523a, 523b and 523d may similarly be connected as second-tier master nodes (i.e., cell controllers) each controlling its own secondary bus or cell.

While the control network 501 shown in FIG. 5 has four first-tier slave nodes 523 and three second-tier slave nodes 533, the number of first-tier slave nodes 523 and second-tier slave nodes 533 is limited only by the ability of the master node to communicate with the slave nodes over the particular data bus. There may be more slave nodes or fewer slave nodes on each bus than shown in the control network 501. In a preferred embodiment, there are no more than eight such cell controllers, although more than eight may be used so long as processing capacity and speed permit.

Figure 7:
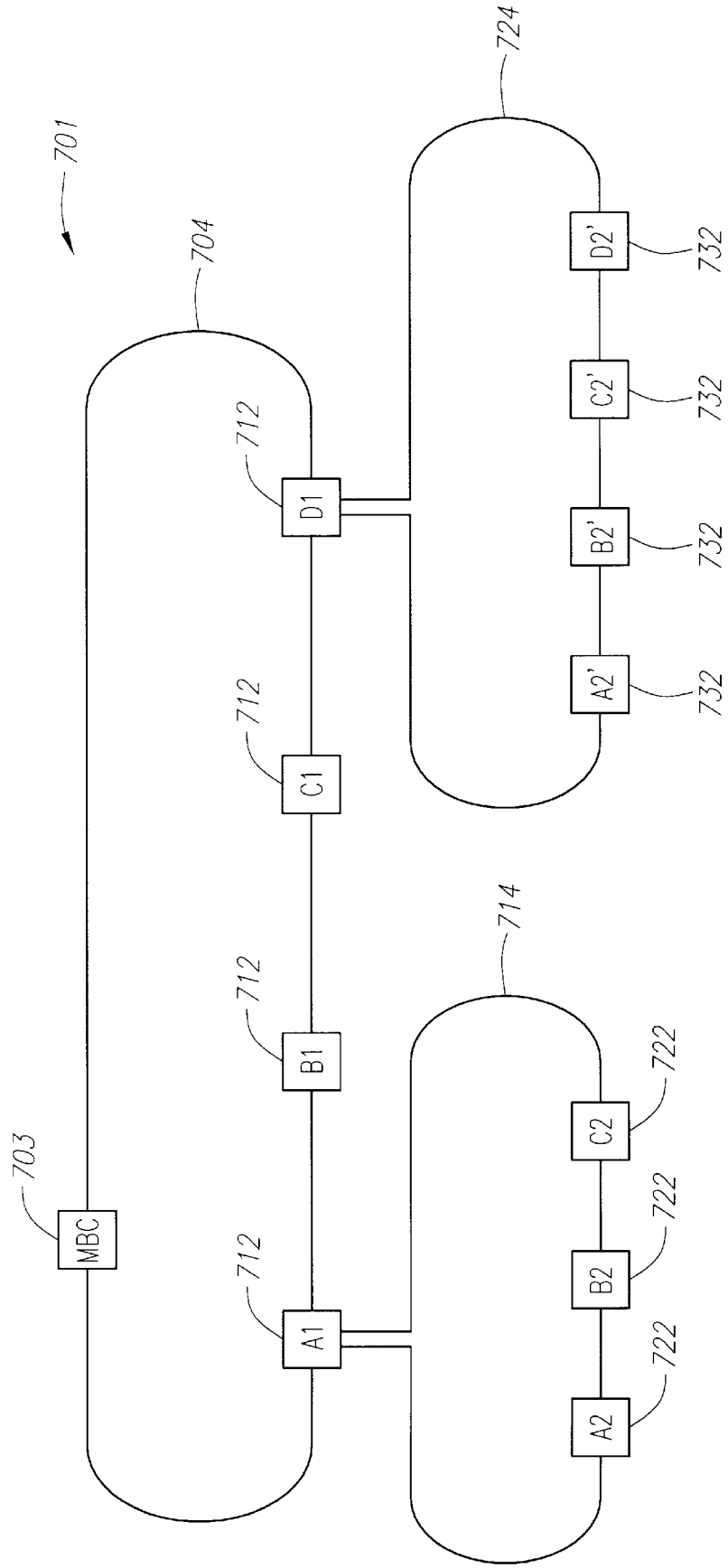
FIG. 7 is a diagram of a hierarchical control network in accordance with one embodiment of the present invention having multiple second-tier buses.
Figure 8:
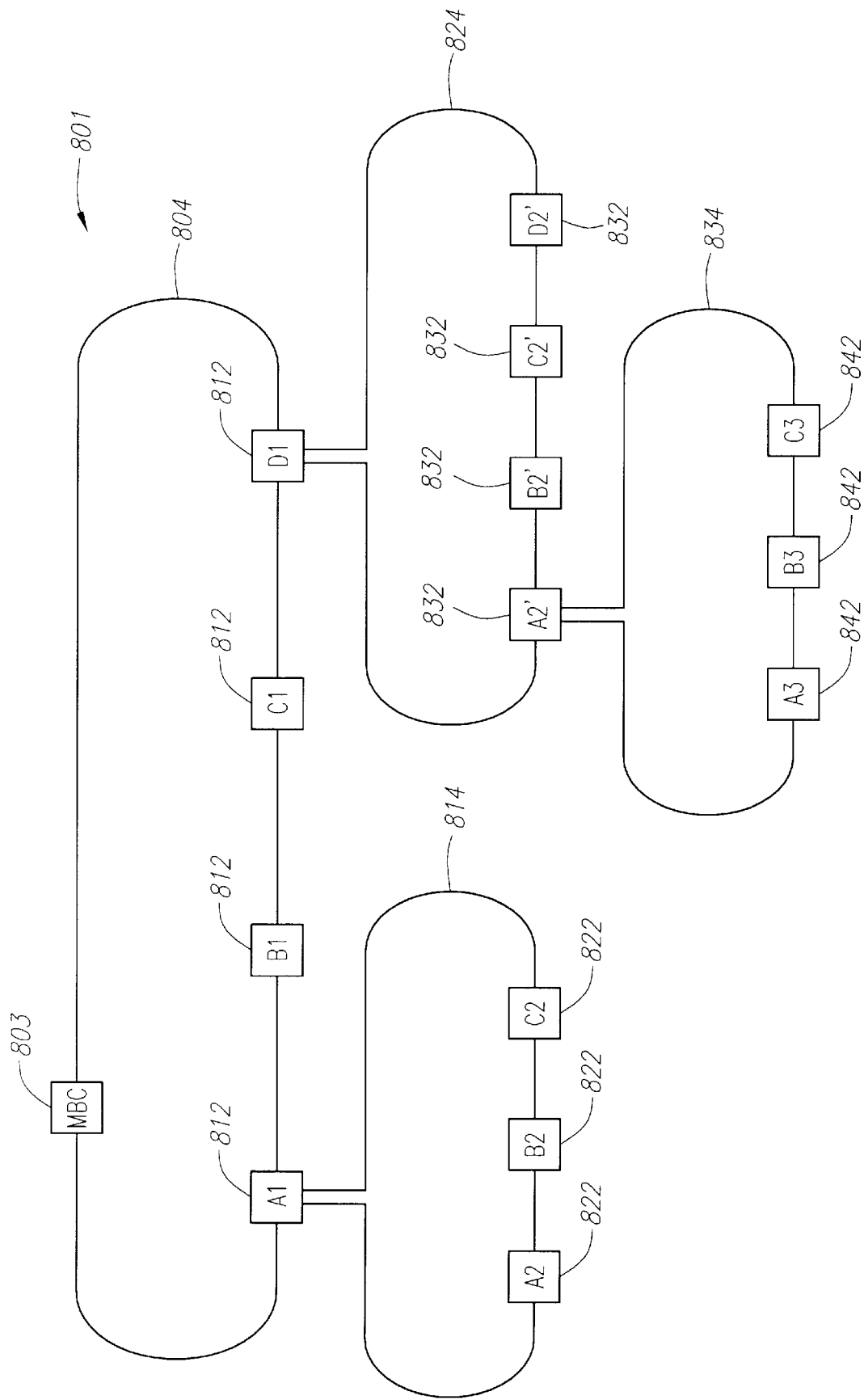
FIG. 8 is a diagram of a hierarchical control network in accordance with another embodiment of the present invention having a third-tier bus.
Figure 9:
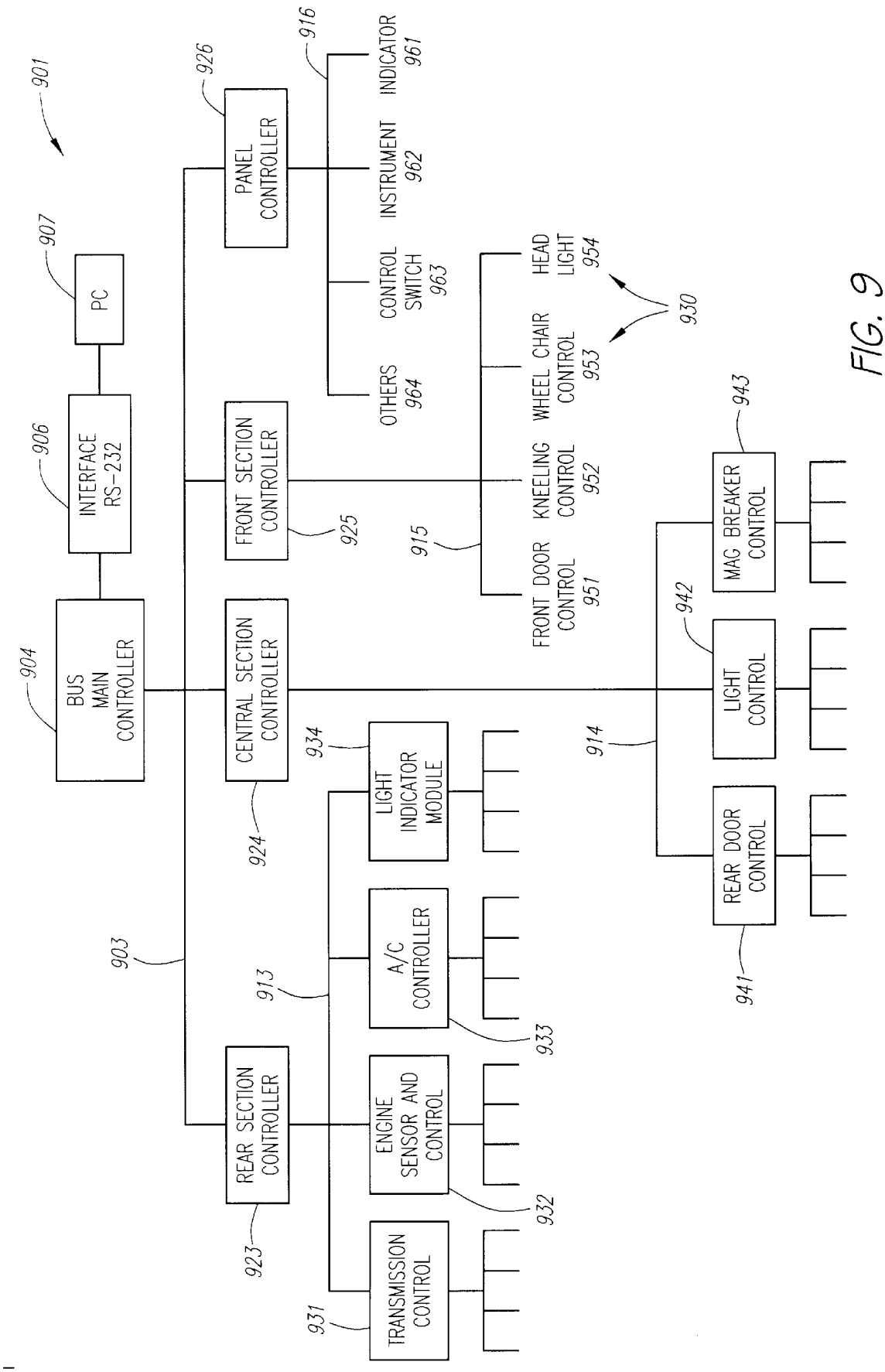
FIG. 9 is a functional diagram of a multi-bus control network illustrating one example of bus architectural layout and node functionality according to one embodiment of the invention.

In addition, further levels of control nesting beyond two data buses may also be provided, using a similar approach to the two data bus method. Thus, for example, one or more of the second-tier slave nodes 533 may be configured as a third-tier master node controlling its own tertiary or third-tier data bus. While FIG. 5 only shows two nested control levels, the same control concepts would apply to a control network architecture having additional nested control levels. Examples of control networks having more than two data buses are depicted in FIGS. 7, 8 and 9 and described in more detail hereinafter.

In a preferred embodiment, communication over the main data bus 504 and the secondary data bus 513 (or buses, if appropriate) is time-multiplexed such that only one node 530 is transmitting over a particular data bus at a given time. Usually, each transmitted message will be targeted for a specific destination node 530, which may be specified by address bits in the transmitted message. However, in some embodiments broadcast messages may also be used targeted to multiple nodes 530.

Responsibilities for tasks, or groups of tasks, may be assigned to specific nodes 530. For example, each of the first-tier slave nodes 223 may be assigned a distinct sphere of responsibility. Similarly, each of the second-tier slave nodes 533 may be assigned a distinct sphere of responsibility. Examples of tasks that may be assigned to different nodes 530 are described for an exemplary control network later herein, with respect to FIG. 9.

Each of the nodes 530 preferably comprises an uplink transceiver 507, a downlink transceiver 508, and a switch 509. Each of the nodes 530 receives signals over its downlink transceiver 508. Over the main data bus 504, the first-tier master node 503 transmits master-control signals to each of the first-tier slave nodes 523. From time to time, according to the programmed control protocol, the first-tier slave nodes 523 respond to the master-control signals, or otherwise send status messages to the first-tier master node 503 when events occur specific to that first-tier slave node 523. Otherwise, the first-tier slave nodes 523 do not ordinarily communicate with each other.

In a similar manner, over each secondary data bus (such as secondary data bus 513), the second-tier master node 523 (for example, first-tier slave/second-tier master node 523c in FIG. 5) transmits master-control signals to each of the second-tier slave nodes 533 connected to the same secondary data bus. From time to time, according to the programmed control protocol, the second-tier slave nodes 533 respond to the master-control signals, or otherwise send status messages to the second-tier master node 523c when events occur specific to that second-tier slave node 533. Otherwise, the second-tier slave nodes 523 do not ordinarily communicate with each other.

Communication between nodes is preferably carried out using half-duplex time division multiplexing. In typical operation, the master node polls each of the slave nodes periodically. Each of the nodes is preferably provided with a unique node identification number or address that distinguishes it from all other nodes of the control network. The master node sends a control message to each slave unit in turn, using the node identification number or address to identify the intended destination. Each of the slave nodes receives the control message but only reacts if it recognizes its own node identification number or address in the control message. The slave node takes the actions requested by the control message received from the master node. Within a designated time period after receiving the control message, the slave node responds to the master node with an acknowledgment message. Each of the slave nodes are polled in turn so that the master node can keep track of events happening throughout the system.

A communication protocol is preferably established so as to avoid collisions on each of the data buses. A simple and effective communication protocol is one in which the master node for the particular data bus sends a control message to a particular slave node, which responds with an acknowledgment or status message within a predetermined amount of time before the master node contacts another slave node. Slave nodes generally do not initiate communication without being first polled by the master node. The master node may also send out a broadcast control message that is intended for receipt by more than one of the slave nodes. The broadcast control message can comprise a node identification number or address that instructs a single particular node to respond to the broadcast control message. Usually, the single node selected for response will be the most critical node requiring receipt of the broadcast control message.

Failure of the current master node (at any of the control levels) commonly results in to the master node either failing to transmit, or else transmitting improper control information to the slave nodes over the data bus. According to a preferred redundant backup control protocol, the slave nodes periodically receive master-control messages from the master node and, in the event that proper master-control messages fail to appear, initiate a failure mode response procedure.

Figure 6:
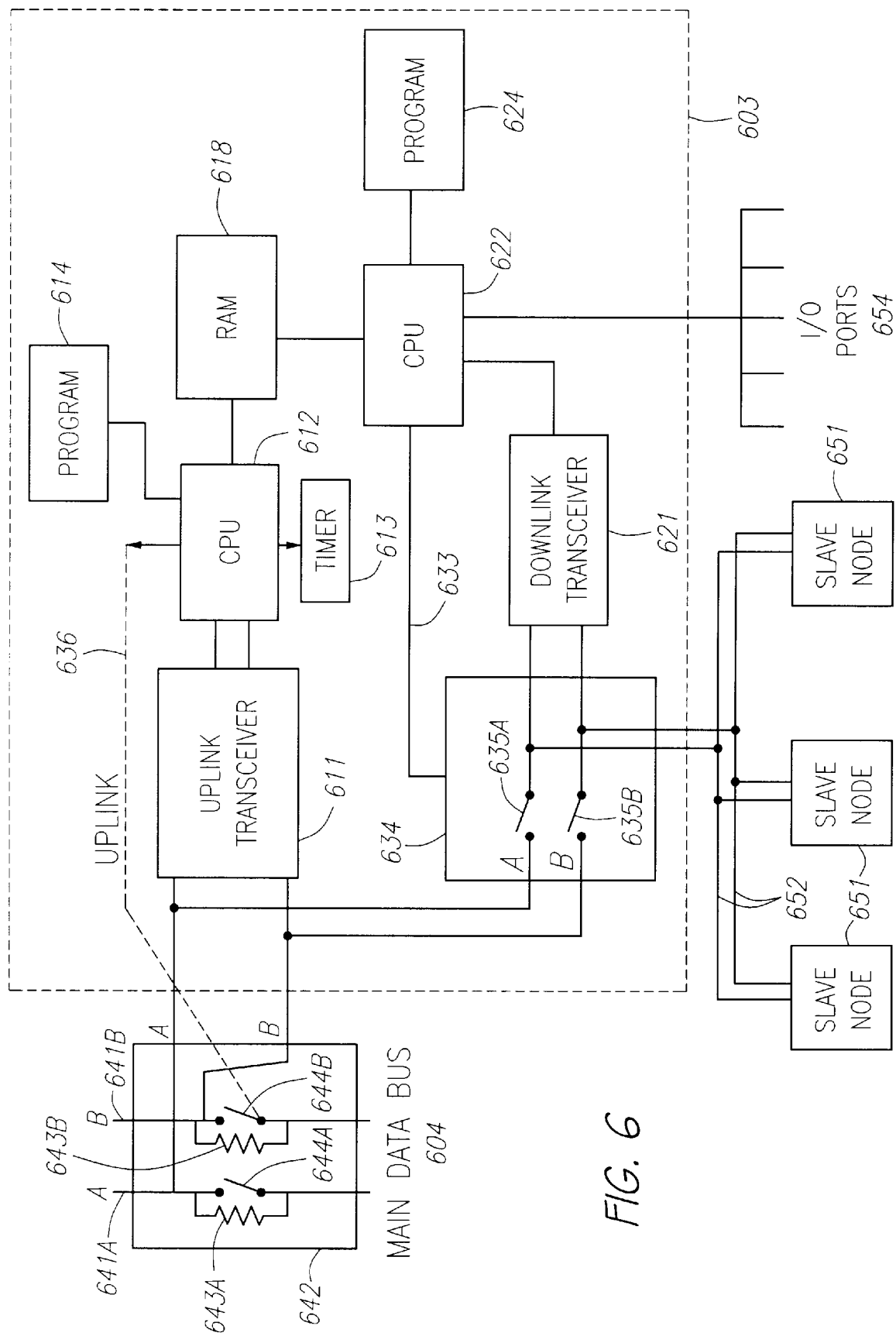
FIG. 6 is a block diagram of a preferred node within the control network architecture shown in FIG. 5.

Detection of and response to a failure mode condition may be explained in greater detail with reference to FIG. 6, which is a block diagram of a preferred embodiment depicting most of the main components of a node (such as any of nodes 530 shown in FIG. 5). Because failure mode detection and response is carried out by a node 530 operating as a slave node, the following discussion will assume that the node 603 shown in FIG. 6 is initially configured as a slave node. Further, for simplicity of explanation, it will be assumed that the node 603 shown in FIG. 6 is a first-tier slave/second-tier master node connected to a main bus and a secondary bus (such as first-tier slave/second-tier master node 523c connected to the main data bus 504 and secondary data bus 513 in FIG. 5), although the same node circuit configuration is preferably used for each of the nodes 530, regardless of control level, for ease of construction and flexibility purposes.

In the node block diagram of FIG. 6, a node 603 is shown connected to a first bus (e.g., main bus) 604. The node 603 comprises an uplink transceiver 611, a downlink transceiver 621, a CPU 612 connected to the uplink transceiver 611, and another CPU 622 connected to the downlink transceiver 621. Both CPUs 612, 622 are preferably connected to a dual-port RAM 618, and each CPU 612, 622 is connected to a ROM program store 614 and to 624, respectively. The second CPU 622 is connected through an appropriate interface to I/O ports 654, which may comprise sensor inputs, control signal outputs, status LEDs, LCD display, keypad, or other types of external connections. It will be understood that the node 603 of FIG. 6 can have all the components and functionality of the node 301 shown in FIG. 3; however, in FIG. 6 only certain basic components needed for explaining the operation of the invention are depicted.

Each node 603 is preferably capable of both sending and receiving messages (e.g., control instructions). Typically, the downlink transceiver 621 operates in a "slave" mode whereby the node 603 receives control instructions using the downlink transceiver 621 and then responds thereto, and the uplink transceiver 611 operates in a "master" mode whereby the node 603 issues control instructions (e.g., polls slave nodes) and awaits a response from other nodes after sending such control instructions.

The downlink transceiver 621 of the node 603 is connected to a secondary data bus 652, to which is also connected a plurality of second-tier slave nodes 651 (assuming the node 603 is a first-tier slave/second-tier master node). The node 603 thereby functions as a first-tier slave node with respect to the main data bus 604, receiving with its uplink transceiver 611 first-tier master-control signals over the main bus 604 from a first-tier master node (such as master node 503 shown in FIG. 5), and also functions as a second-tier master node with respect to the secondary data bus 652, transmitting second-tier master-control signals with its downlink transceiver 634 to second-tier slave nodes 651.

The node 603 also comprises a pair of switches 635a, 635b connected between the downlink transceiver 621 and the signal lines 643a, 643b of the main data bus 604. In normal operation, the switches 635a, 635b remain open (unless the node 503 is also the first-tier master node, such as master node 503 shown in FIG. 5, in which case the switches 635a, 635b would be closed), and the downlink transceiver 621 is thereby isolated from the main data bus 604. However, when a first-tier master node failure condition is detected, switches 635a, 635b are closed, enabling the downlink transceiver 621 to take over for the first-tier master node. The downlink transceiver 621 would therefore function simultaneously as master node with respect to both the main data bus 604 and the secondary data bus 652.

In a preferred embodiment, detection of a master node failure condition on the main data bus 604 is accomplished using a timer mechanism, such as a hardware timer 613 accessible (either directly or indirectly) by the CPU 612 that is connected to the uplink transceiver 611. According to a preferred control protocol (assuming the node 603 is a first-tier slave/second-tier master node), the uplink transceiver 611 of node 603 receives first-tier master-control signals periodically from the first-tier master node (such as master node 503 in FIG. 5). The master-control signals may, for example, request status information from the node 603, or instruct the node 603 to carry out certain control or input/output functions. The node 603 ordinarily responds by carrying out the requested functions and/or sending an acknowledgment or status signal to the first-tier master control node using the uplink transceiver 611.

Timer 613 times out a wait period between master-control signals received from the first-tier master control node. In a preferred embodiment, each time the uplink transceiver 611 receives a master-control signal from the first-tier master node that is recognized as an appropriate master-control signal within the particular programmed control protocol (whether or not the master-control signal is directed to the particular node 603), the CPU 612 connected to the uplink transceiver 612 resets the timer 613. If the timer 613 ever times out, then CPU 612 responds by asserting a failure mode response procedure. The timing out of timer 613 may result in an interrupt to CPU 612 in order to inform the CPU 612 of the failure to receive master-control signals, or else the CPU 612 may periodically monitor the timer 613 and, when the CPU 612 notices that the timer 613 has timed out, assert a failure mode response procedure.

When a failure mode condition is detected, the CPU 612 sets a failure mode status bit in a predetermined flag location within the dual-port RAM 618. The other CPU 622 periodically monitors the failure mode status bit in the dual-port RAM 618 and is thereby informed when a failure occurs. Alternatively, instead of the CPUs 612, 622 communicating through the dual-port RAM 618, timer 613 can directly inform CPU 622 when a failure to receive master-control signals has occurred (i.e., when timer 613 has timed out).

When the CPU 622 has been informed or otherwise determined that a failure mode condition exists, and that the first-tier master node has presumably failed, the CPU 622 sends a signal over control line 633 to close switches 635*a*, 635*b*, thereby connecting the downlink transceiver 621 to the main bus 604. From that point on, the CPU 622 performs as the first-tier master node with respect to the main bus 604. The node 603 can continue to receive information over the main data bus 604 using the uplink transceiver 611. Alternatively, the node 603 may thereafter perform all transmission and reception over both the main bus 604 and the secondary bus 652 using the downlink transceiver 621. When the failure mode is entered, the CPU 622 may be programmed so as to directly carry out the I/O port functions for which it previously received instructions from the first-tier master node, or the node 603 may send master-control signals to its own uplink transceiver 611 and thereby continue to carry out the I/O port functions as it had previously been doing. In other words, the node 603 can give itself control instructions over the main data bus 604 so that it can continue to perform its previously assigned functions. If, after taking over for the first-tier master node, the node's downlink transceiver 611 should fail, the node 603 can still continue to perform its control functions when the next slave node takes over control as the new first-tier master node (as later described herein), because its uplink transceiver 611 continues to function in a normal manner.

According to the above described technique, the node 603 thereby substitutes itself for the first-tier master node upon the detection of a first-tier master node failure as indicated by the failure to receive the expected first-tier master-control signals. Should the node 603 fail, either before or after taking over control for the first-tier master node, the next first-tier slave node would take over and become the first-tier master node in a similar manner to that described above.

Referring again to FIG. 5, the order in which the first-tier slave nodes 523 take over for the first-tier master node 503 is dictated by the wait period timed out by the timer 613 of the particular first-tier slave node 523. The timer 613 (see FIG. 6) for each first-tier slave to node 523 is programmed or reset using a different time-out value. A first-tier slave node 523 only asserts a failure mode condition when its internal timer 613 reaches the particular timeout value programmed for that particular node 523.

While the programmed wait periods for the internal timer 613 in each first-tier slave node 523 can vary depending upon the control application, illustrative wait periods are programmed in ten millisecond increments. Thus, for example, first-tier slave node 523*a* could be programmed with a 10 millisecond wait period; the next first-tier slave node 523*b* could be programmed with a 20 millisecond wait period; the next first-tier slave node 523*c* could be programmed with a 30 millisecond wait period; and the last first-tier slave node 523*d* could be programmed with a 40 millisecond wait period; and so on. First-tier slave node 523*a* would take over as the first-tier master node if 10 milliseconds elapses without it receiving any proper first-tier master-control signals; the next first-tier slave node 523*b* would take over as the first-tier master node if 20 milliseconds elapses without it receiving any proper first-tier master-control signals; the next first-tier slave node 523*c* would take over as the first-tier master node if 30 milliseconds elapses without it receiving any proper first-tier master-control signals; and so on.

Use of 10 millisecond increments for the wait periods in the above example is considered merely illustrative, and the actual wait periods should be selected depending upon the time criticality of the control messages, and the number of messages that may be missed before a high enough degree of certainty is established that the master node has failed. For example, if a slave node expects to observe a control-message signal on the data bus no later than every 5 milliseconds, then the slave node may be programmed to assert a failure mode condition after a wait period corresponding to the absence of a predefined number of messages—for example, twenty messages (i.e., 100 milliseconds). If critical aspects of the system requiring master node control need to be serviced in a shorter time period, then the wait period would have to be reduced to accommodate the time-sensitive components of the system.

The order in which the slave nodes take over for the master node need not be dictated by the relative position in the control loop of the slave node with respect to the master node, but rather may be dictated according to the programmed wait period in each slave node. Flexibility is thereby provided in the order of priority in which the slave nodes take over for the master node in the event of a failure event.

Accordingly, by use of the inventive techniques described herein, redundant backup for the first-tier master node 503 is provided. Such redundant backup control is provided without requiring additional physical nodes to be located within the control system, and without having to provide wiring for such additional physical nodes to the buses 504 or 513. The redundant backup for the master node 504 is also accomplished while resolving contention problems that might otherwise occur if each of the first-tier slave nodes 523 were programmed with the identical timeout period.

In a preferred embodiment, redundant backup control is provided in a similar manner for the secondary data bus 513, and each additional data bus that may be provided in the system (e.g., in systems such as shown in FIGS. 7, 8 or 9). Thus, each of the second-tier slave nodes 533 is preferably configured with the circuitry shown for node 603 in FIG. 6, and each of the second-tier slave nodes 533 can therefore substitute itself for the first-tier slave/second-tier master node 523*c* if the first-tier slave/second-tier master node 523*c* fails.

If a particular node is operating as a master node for two buses as a result of a failure of the master node on a higher-tier bus, and the node operating as such fails, then it is possible that two different nodes will take over for the failed node, one node taking over on each bus. For example, supposing that first-tier slave/second-tier master node 523c has already taken over as the first-tier master node due to a failure of the master node 503, and further suppose that first-tier slave/second-tier master node 523c too fails, then the next first-tier slave node 523d would take over as the first-tier master node with respect to the main data bus 504, but the first second-tier slave node 533a would take over as second-tier master node with respect to the secondary data bus 513.

In the above manner, despite the failure of one or more nodes, substantial functionality of the control system as a whole can be maintained. A failed node is essentially discarded or bypassed to the extent possible so as to maintain the highest possible degree of continued operability. Furthermore, because certain parts of the system will continue operate despite the failure of the master node, identification of the failed node by engineers or maintenance personnel should be simplified by being able to identify the inoperative portion of the system that has become isolated due to the failure.

In one aspect, separation of responsibility in each node 603 of master functions and slave functions between two different CPU's each operating with a different transceiver allows the node 603 to potentially continue operating as either a master node or a slave node should one of the CPU's fail, providing that the failure does not disrupt both of the transceivers at the node 603.

In a preferred embodiment, the nodes 530 of FIG. 5 are wired using a single cable connecting all of the nodes 530 in a loop configuration. Details of such a wiring technique are described in copending U.S. application Ser. No. 08/854,172 entitled "Wiring Method and Apparatus for Distributed Control Network," previously incorporated herein by reference.

In a preferred embodiment, the nodes 530 of FIG. 5 are configured with fault isolation and recovery circuitry in the case of a short circuit or similar event. Details of such fault isolation and recovery circuitry are described in copending U.S. application Ser. No. 08/853,893 entitled "Fault Isolation and Recovery In A Distributed Control Network," previously incorporated herein by reference.

Figure 10A:
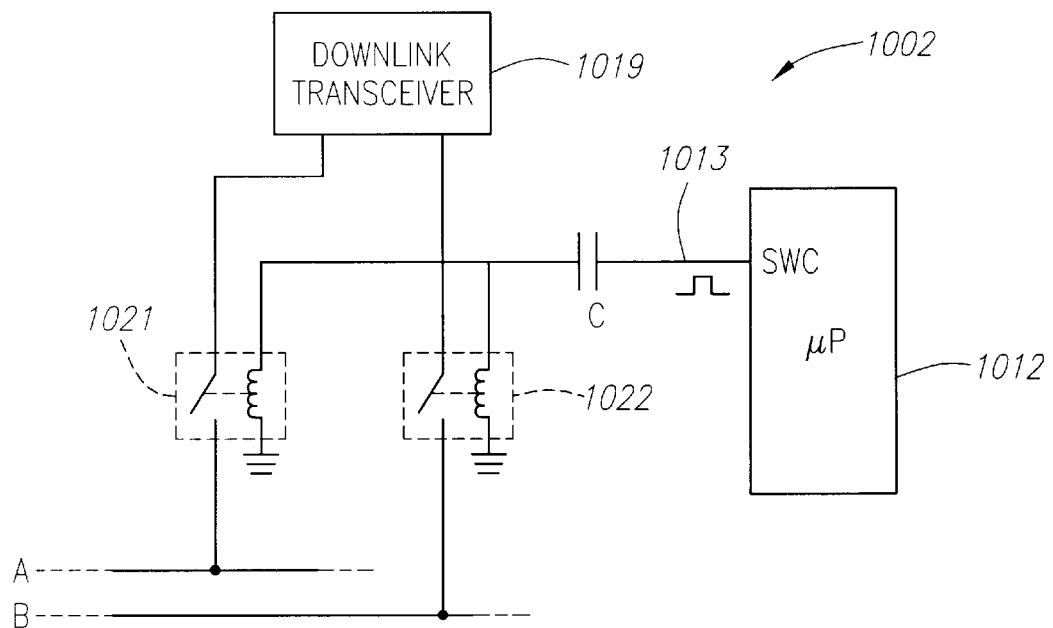
FIGS. 10A and 10B are block diagrams of fail-safe circuits for causing a set of relays to open upon failure of a microprocessor.
Figure 10B:
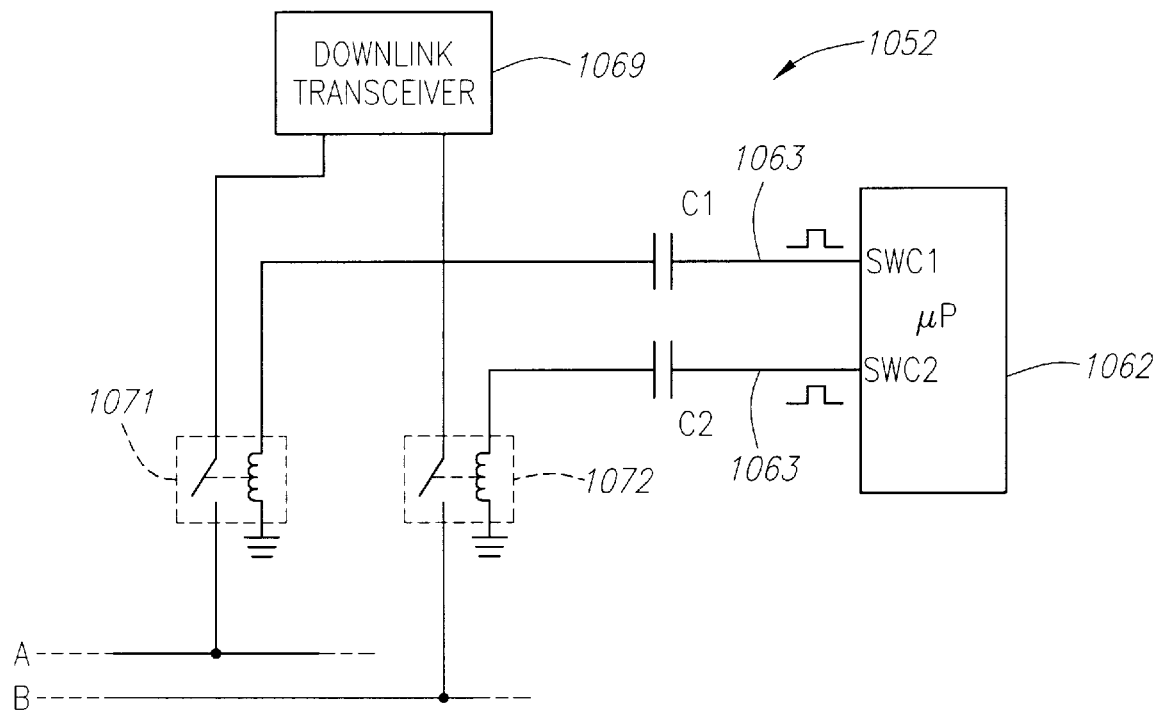

In another aspect of the invention, a fail-safe relay control circuit is provided whereby a node failure will result in most instances in the node being disconnected from the data bus without causing further harm to the system by, for example, contending for control or otherwise interfering with use of the data bus. FIGS. 10A and 10B show two alternative embodiments of a fail-safe relay control circuit in accordance with one or more aspects of the present invention. In FIG. 10A, a microprocessor 1012 is connected to relays 1021 and 1022 through relay control line 1013. Wires A and B of a bus (such as data bus 604 shown in FIG. 6) are connected to relays 1021 and 1022, respectively. When relays 1021 and 1022 are closed, a downlink transceiver 1019 is connected to wires A and B of a data bus. When relays 1021 and 1022 are open, the downlink transceiver 1019 is isolated from wires A and B of the data bus.

The open or closed state of relays 1021 and 1022 is controlled in FIG. 10A by relay control line 1013 connected to the microprocessor 1012. During time periods when relays 1021 and 1022 are to be open, the microprocessor 1012 holds relay control signal 1013 in a steady state (e.g., low). During time periods when relays 1021 and 1022 are to be closed, the microprocessor 1012 generates a periodic signal over relay control line 1013, which charges a capacitor C located along relay control line 1013 in serial connection with relays 1021 and 1022. The discharging of capacitor C causes current to flow and allows relays 1021 and 1022 to remain energized and therefore closed. Should the microprocessor 1012 fail, then relay control line 1013 will most likely be stuck in a steady state (either high, low or floating). This will cause capacitor C to eventually reach a steady state and, regardless of which state the relay control line 1013 was previously held, cause the relays 1021 and 1022 to become de-energized, thereby opening the relays 1021 and 1022 and decoupling the downlink transceiver 1019 from wires A and B of the data bus.

The periodic signal on relay control line 1013 may be generated by programming the microprocessor 1012 to perform a timed software loop. For example, where the relays 1021, 1022 are to be closed, the microprocessor 1012 may be programmed to enter a relay signal control subroutine each time a predetermined time interval elapses, as indicated by an to interrupt or clock polling routine or other appropriate timing method. Each time the relay signal control subroutine is entered, the microprocessor toggles the state of the relay control signal 1013, thereby produced a 50% duty cycle waveform with a period determined by the predetermined time interval. The predetermined time interval should be selected so as to result in the generation of a periodic signal over relay control line 1013 having a frequency selected so as to allow capacitor C by its periodic discharging to maintain enough current through the relays 1021, 1022 such that they stay energized. The frequency selected therefore depends mainly on the capacitance of capacitor C and the impedances of the relays 1021, 1022.

Alternatively, a slightly more involved software timing loop may be programmed using the microprocessor 1012 so that a signal is generated having a duty cycle other than 50%. However, generation of a 50% duty cycle waveform is simpler to implement.

Should the microprocessor 1012 fail, it would in most circumstances be desirable to disconnect the microprocessor 1012 from the data bus. (As shown in FIG. 6, for example, it is assumed that the microprocessor 1012 shown in FIG. 10A is the microprocessor 622 controlling the downlink transceiver 621, in which case microprocessor 622 would be operating as the master node for the data bus 604.) Depending on the nature of the failure, the microprocessor 1012 would most likely stop running the software loop keeping the relays 1021, 1022 closed. In this event, relay control signal 1013 would become stuck in a steady state, or a floating state, causing capacitor C to eventually stop discharging and the relays 1021, 1022 to de-energize and open. Accordingly, the circuitry of FIG. 10A provides a fail-safe mechanism whereby the microprocessor 1012 essentially disconnects itself from the data bus upon a failure that causes the microprocessor 1012 to stop executing its programmed functions.

FIG. 10B shows an alternative fail-safe circuit having the same function as the circuit shown in FIG. 10A. In FIG. 10B, the microprocessor 1062 has separate relay control lines 1063 and 1064 connected to relays 1071 and 1072, respectively, through series capacitors C1 and C2, respectively. The microprocessor 1062 is programmed with a software timing loop in a similar manner to that described above for microprocessor 1012 in FIG. 10A, whereby the microprocessor 1062 generates periodic signals over relay control lines 1063 and 1064 to charge capacitors C1 and C2 and to keep relays 1071 and 1072 energized and, therefore, closed. Should microprocessor 1062 fail, the relays 1071 and 1072 will become de-energized and open, disconnecting the microprocessor 1062 from the data bus.

The fail-safe relay control circuits shown in FIGS. 10A and 10B may be employed in the circuitry of the node 603 shown in FIG. 6. In particular, relay control signal 1013 in FIG. 10A or relay control signals 1063 and 1064 in FIG. 10B would correspond to signal 633 of node 603 in FIG. 6.

FIGS. 7, 8 and 9 depicts various embodiments having more than two data buses, so as to provide additional levels of control beyond that afforded by a dual-bus architecture. Each of the nodes shown in FIGS. 7, 8 and 9 is preferably configured to include the circuitry shown for preferred node 603 in FIG. 6. FIG. 7 shows an example of a system architecture for a control network having three data buses 704, 714 and 724. A first-tier master node 703 and a plurality of first-tier slave nodes 712 are connected to the main data bus 704. One of the first-tier slave nodes 712, designated as A1 in FIG. 7, operates as a second-tier master node, and is connected to the second data bus 714 along with a plurality of second-tier slave nodes 722. Another of the first-tier slave nodes 712, designated as D1 in FIG. 7, operates as another second-tier master node, and is connected to the third data bus 724 along with another plurality of second-tier slave nodes 732. The other first-tier slave nodes 712, designated B1 and C1 in FIG. 7, could also be configured as master nodes of a second-tier bus. FIG. 7 thereby provides a hierarchical control network 701 having two control levels or tiers, and three data buses.

FIG. 8 shows an example of a system architecture for a control network having four buses 804, 814, 824 and 834. In a similar manner to FIG. 7, a first-tier master node 803 and a plurality of first-tier slave nodes 812 are connected to the main data bus 804. One of the first-tier slave nodes 812, designated as A1 in FIG. 8, operates as a second-tier master node, and is connected to the second data bus 814 along with a plurality of second-tier slave nodes 822. Another of the first-tier slave nodes 812, designated as D1 in FIG. 8, operates as another second-tier master node, and is connected to the third data bus 824 along with another plurality of second-tier slave nodes 832. One of the second-tier slave nodes 832 connected to the third data bus 824, denoted as A2' in FIG. 8, operates as a third-tier master node with respect to the fourth data bus 834, which is connected to a plurality of third-tier slave nodes 842. FIG. 8 thereby provides a hierarchical control network 801 having three control levels or tiers, and four data buses.

It will be appreciated that, expanding the approach used in FIGS. 7 and 8, additional control levels may be created by adding successive lower control tiers, or additional slave nodes at any particular tier may be configured as cell controllers to control additional localized data buses. A great deal of flexibility is thereby provided in establishing a hierarchical control structure suitable for many different control applications.

FIG. 9 is a diagram showing, from a functional standpoint, an example of a particular control application having multiple data buses in accordance with the hierarchical control principles discussed herein. In FIG. 9, a control network 901 comprises a master node 904 which is connected to a plurality of slave nodes 923, 924, 925 and 926, each of which is assigned a particular sphere of responsibility within the control network. A main bus 903 forms a communication link between the master node 904 and the slave nodes 923, 924, 925 and 926.

Generally, the nature of the slave nodes 923, 924, 925 and 926 depends in part on the control application in which they are deployed. In the example of FIG. 9, the slave nodes 923, 924, 925 and 926 are deployed in a vehicle or railcar, and so the slave nodes 923, 924, 925 and 926 have functionality suited for such a control application. For example, the slave nodes include a slave node 923 operating as a rear section controller, a slave node 924 operating as a central section controller, a slave node 925 operating as a front section controller, and a slave node 926 operating as a panel controller. There may also be additional slave nodes if required.

Each of slave nodes 923, 924, 925 and 926 are considered first-tier slave nodes in the illustrative embodiment shown in FIG. 9. In the control network 901 of FIG. 9, two of the first-tier slave nodes 923, 924 also act as second-tier master nodes for additional data buses. Thus, first-tier slave node 923 operates as a second-tier master node with respect to a second data bus 913, and first-tier slave node 924 operates as a second-tier master node with respect to a third data bus 914. First-tier slave/second-tier master node 923 is connected to a plurality of second-tier slave nodes 931, 932, 933 and 934, which may each be assigned a sub-sphere of responsibility in the cell controlled by the rear section controller. The second-tier slave nodes may therefore include, for example, a slave node 931 operating as a transmission controller, a slave node 932 operating as an engine sensor and controller, a slave node 933 operating as an air conditioner controller, and a slave node 934 operating as a light indicator controller.

Similarly, first-tier slave/second-tier master node 924 is connected to another plurality of second-tier slave nodes 941, 942 and 943, each of which may be assigned a sub-sphere of responsibility in the cell controlled by the central section controller. The second-tier slave nodes may therefore include, for example, a slave node 941 operating as a rear door controller, a slave node 942 operating as a light controller, and a slave node 943 operating as a magnetic breaker controller.

Each of the first-tier slave nodes 923, 924, 925 and 926 (even if operating as a second-tier master node) may be connected to one or more input/output modules 930. For example, the slave node 925 operating as a front section controller may be connected to a front door control module 951, a kneeling mechanism control module 952, a wheel chair platform control module 953, and a headlight output module 954. Likewise, the slave node 926 operating as a panel controller may be connected to an indicator module 961, an instrument module 962, a control switch module 963, and other miscellaneous modules 964. Virtually any type of input/output or control function may represented as a module 930. In each instance, the respective slave node 923, 924, 925 and 926 controls the input/output modules 930 connected to it.

The master node 904 may be connected to a computer 907 through an interface 906 (such as an RS-232 interface), if desired. Through the computer 907, the master node 904 can be instructed to execute certain functions or enter certain control modes. Also, the master node 904 can be monitored or reprogrammed through the computer 907.

In operation, the master node 904 communicates with the cell controllers 923, 924, 925 and 926 using the main bus 903. The master node 904, as previously described, is generally responsible for delegating control commands to the slave nodes 923, 924, 925 and 926, and for responding to status information and events communicated to the master node 904 over the main bus 903. Each of the slave nodes 923, 924, 925 and 926 receives commands from the master node 904, and issues appropriate commands to their respective second-tier slave nodes 931–934 or 941–943, or input/output modules 930.

Generally, the slave nodes are disposed in physical locations near the mechanisms which they control. The main data bus 904 and secondary data buses 913, 914 each form a loop connecting the various nodes connected to the bus in a continuous fashion. The data buses 904, 913 and 914 are not restricted to any particular baud rate. Rather, communication may be carried out over each data bus 904, 913 and 914 at a rate that is suitable for the particular control application. Moreover, there is no particular requirement that the data buses in the the FIG. 9 control network (or the more generalized control networks shown in FIGS. 7 and 8) be serial data buses. Rather, the data buses may be parallel data buses in situations, for example, where a high data bandwidth is required.

In the particular control application relating to FIG. 9, each of the nodes is preferably housed in a rugged, potted case made of a suitable lightweight material such as aluminum that provides environmental protection and allows for heat dissipation, as previously described with respect to FIG. 4. In other control environments, other types of housings may be used.

While preferred embodiments are disclosed herein, many variations are possible which remain within the concept and scope of the invention. Such variations would become clear to one of ordinary skill in the art after inspection of the specification and drawings herein. The invention therefore is not to be restricted except within the spirit and scope of any appended claims.

What is claimed is:

1. A control network, comprising:
    a common bus;
    a master node connected to the common bus; and
    a plurality of slave nodes connected to the common bus in a loop configuration with said master node, each slave node comprising
        a downlink transceiver isolated from the common bus when the slave node is in normal operation,
        an uplink transceiver connected to the common bus, whereby said slave node receives master-control signals over the common bus, and
        a failure mode detector;
    wherein at least one slave node substitutes itself for the master node by connecting its downlink transceiver to the common bus when the slave node's failure mode detector detects a failure of said master node, while said slave node's uplink transceiver remains connected to the common bus such that the slave node thereafter receives master-control signals sent by its own downlink transceiver.

2. The control network of claim 1, wherein said failure mode detector comprises a timer connected to said uplink transceiver, said timer timing out a predefined wait period and being periodically reset when said uplink transceiver receives a message signal from said master node.

3. The control network of claim 1 further comprising a second common bus, wherein at least one of said slave nodes functions as a master node for a second set of slave nodes connected in a loop configuration to said second common bus.

4. The control network of claim 3, wherein first and second common buses are connected under control of a single master node when said slave node functioning as a master node for the second set of slave nodes substitutes itself as master node with respect to the first common bus.

5. The control network of claim 1, wherein each slave node further comprises a control unit connected to a plurality of switches, said switches operable to connect or disconnect the downlink transceiver of the slave node to the common bus under the control of the control unit.

6. The control network of claim 5, wherein said switches remain open under normal operation, and wherein said switches are closed by said control unit when the slave node's failure mode detector detects a failure of said master node, thereby allowing the slave node to take over as a new master node.

7. The control network of claim 1, wherein each slave node further comprises a first central processing unit connected to the uplink transceiver and a second central processing unit connected to the downlink transceiver, said failure mode detector comprising a timer connected to said first central processing unit.

8. The control network of claim 1, wherein said master node sends periodic polling messages to the slave nodes, and the slave nodes respond to the periodic polling messages with response acknowledgment messages.

9. A method for providing redundant backup master control in a control network which comprises a master node and a plurality of slave nodes connected in a loop configuration, said method comprising the steps of:
    sending messages from the master node to the slave nodes over a common bus;
    receiving the messages from the master node at each slave node;
    monitoring at each slave node an amount of time from receipt of the most recent message from the master node;
    substituting one of the slave nodes for the master node when said amount of time reaches a predetermined failure mode waiting period, said substitute master node thereafter concurrently functioning as both a slave node and a master node;
    sending messages from said substitute master node to the slave nodes, including itself, over said common bus; and
    receiving the messages from said substitute master node at each slave node, including itself.

10. The method of claim 9 wherein at least one of the slave nodes is preprogrammed with the functionality of the master node.

11. The method of claim 9 further comprising, after the step of substituting one of the slave nodes for the master node when said amount of time reaches a predetermined failure mode waiting period, the steps of:
    monitoring at each remaining slave node a second amount of time from receipt of the most recent message from the substitute master node; and
    substituting one of the remaining slave nodes for the substitute master node when said second amount of time reaches a second predetermined failure mode waiting period, said second predetermined failure mode waiting period being longer than the first predetermined failure mode waiting period.

12. The method of claim 11 wherein:
    the step of receiving the messages from the master node at each slave node comprises the step of receiving messages from the master node using an uplink transceiver located at each slave node;
    the step of sending messages from the substitute master node to the slave nodes over the common bus comprises the step of sending messages using a downlink transceiver located at the substitute slave node; and the step of receiving the messages from the substitute master node at each slave node comprises the step of receiving message from the substitute master node using the uplink transceiver located at each slave node.

13. A multi-bus control network with redundant backup control, said multi-bus control network comprising:

a first bus;

a second bus;

a first-tier master node connected to the first bus;

a plurality of first-tier slave nodes connected to the first bus in a loop configuration, each first-tier slave node comprising
 a first-tier slave node downlink transceiver isolated from the first bus when the first-tier slave node is in normal operation,
 a first-tier slave node uplink transceiver connected to the first bus, whereby said first-tier slave node receives control message signals over the first bus, and
 a first-tier slave node failure mode detector;

a plurality of second-tier slave nodes connected to the second bus in a loop configuration, each of said second-tier slave nodes comprising
 a second-tier slave node downlink transceiver isolated from the second bus when the second-tier slave node is in normal operation,
 a second-tier slave node uplink transceiver connected to the second bus, whereby said second-tier slave node receives control message signals over the second bus, and
 a second-tier slave node failure mode detector;

wherein at least one first-tier slave node substitutes itself for the first-tier master node by connecting its first-tier slave node downlink transceiver to the first bus when the first-tier slave node's first-tier slave node failure mode detector detects a failure of said first-tier master node;

wherein at least one first-tier slave node has its first-tier downlink transceiver connected to the second bus and functions as a second-tier master node with respect to the second-tier slave nodes; and wherein at least one second-tier slave node substitutes itself for the second-tier master node by connecting its second-tier slave node downlink transceiver to the second bus when the second-tier slave node's second-tier slave node failure mode detector detects a failure of said second-tier master node.

14. The multi-bus control network of claim 13, wherein said first-tier slave node failure mode detector comprises a timer connected to said first-tier slave node uplink transceiver, said timer timing out a predefined wait period and being periodically reset when said first-tier slave node uplink transceiver receives a message signal from said first-tier master node.

15. The multi-bus control network of claim 13, wherein said second-tier slave node failure mode detector comprises a timer connected to said second-tier slave node uplink transceiver, said timer timing out a predefined wait period and being periodically reset when said second-tier slave node uplink transceiver receives a message signal from said second-tier master node.

16. The multi-bus control network of claim 13, wherein each first-tier slave node further comprises a first-tier slave node control unit connected to a plurality of switches, said switches operable to connect or disconnect the first-tier slave node downlink transceiver to the first bus under the control of the first-tier slave node control unit.

17. The multi-bus control network of claim 16, wherein said switches remain open under normal operation, and wherein said switches are closed by said first-tier slave node control unit when the first-tier slave node failure mode detector of the particular first-tier slave node detects a failure of said first-tier master node.

18. The multi-bus control network of claim 13, wherein each first-tier slave node further comprises a second-tier slave node control unit connected to a plurality of switches, said switches operable to connect or disconnect the second-tier slave node downlink transceiver to the second bus under the control of the second-tier slave node control unit.

19. The multi-bus control network of claim 18, wherein said switches remain open under normal operation, and wherein said switches are closed by said second-tier slave node control unit when the second-tier slave node failure mode detector of the particular second-tier slave node detects a failure of said second-tier master node.

20. The multi-tier control network of claim 13, wherein a plurality of the first-tier slave nodes are capable of substituting for the first-tier master node when the first-tier slave node's failure mode detector detects a failure of the first-tier master node, each first-tier slave node being programmed with a different waiting period before a failure of the first-tier master node is declared, such that only one first-tier slave node at a given time will detect a failure of the first-tier master node, the different waiting period at each first-tier slave node defining a relative position in a hierarchy by which the first-tier slave node will take over operation as the first-tier master node in case of a failure of the first-tier master node.

21. A multi-tier control network, comprising:

a first common bus;

a first-tier master node connected to the first common bus;

a plurality of first-tier slave nodes connected to the first common bus, each of said first-tier slave nodes capable of receiving commands from said first-tier master node over the first common bus;

a second common bus, said second common bus connected to one of said first-tier slave nodes acting as a second-tier master node; and a plurality of second-tier slave nodes connected to the second common bus, each of said second-tier slave nodes capable of receiving commands from said first-tier slave node acting as a second-tier master node;

said first-tier slave node acting as a second-tier master node comprising a failure mode detector whereby said first-tier slave node substitutes itself for said first-tier master node in the event of a failure by said first-tier master node, said first-tier slave node connecting said first common bus and said second common bus together to form a single common bus in the event of said failure by said first-tier master node.

22. The multi-tier control network of claim 21 wherein said first-tier master node and first-tier slave nodes are connected in a loop configuration along said first common bus, and wherein said first-tier slave node acting as a second-tier master node and said second-tier slave nodes are connected in a loop configuration along said second common bus.

23. The multi-tier control network of claim 22, wherein said second-tier master node comprises an uplink transceiver and a downlink transceiver, said second-tier master node sending commands with its downlink transceiver over said single common bus and continuing to receive commands with its uplink transceiver over said single common bus after substituting itself for said first-tier master node.

24. The multi-tier control network of claim 21, wherein said first-tier master node comprises a downlink transceiver for sending commands over said first common bus, and an uplink transceiver capable of monitoring said second common bus.

* * * * *